United States Patent
Fattah et al.

(10) Patent No.: US 7,274,325 B2
(45) Date of Patent: Sep. 25, 2007

(54) OPTIMIZED METHOD OF PERFORMING SPATIAL TRANSFORMATION

(75) Inventors: Eric Fattah, Coquitlam (CA); Laurent Pelissier, North Vancouver (CA); Kris Dickie, Chilliwack (CA)

(73) Assignee: Ultrasonix Medical Corporation, Vancouver BC (CA)

( * ) Notice: Subject to any disclaimer, the term of this patent is extended or adjusted under 35 U.S.C. 154(b) by 641 days.

(21) Appl. No.: 10/328,651

(22) Filed: Dec. 23, 2002

(65) Prior Publication Data
US 2004/0122314 A1     Jun. 24, 2004

(51) Int. Cl.
*G01S 13/00*     (2006.01)
*A61B 8/00*     (2006.01)

(52) U.S. Cl. .................... 342/185; 600/407; 600/437
(58) Field of Classification Search ............... 600/437, 600/443–448; 342/25 A, 25 E, 55–56, 89, 342/176, 179, 185
See application file for complete search history.

(56) References Cited

U.S. PATENT DOCUMENTS

| | | | | |
|---|---|---|---|---|
| 4,430,725 A | * | 2/1984 | Elliott et al. | 715/511 |
| 5,001,625 A | * | 3/1991 | Thomas et al. | 710/305 |
| 5,528,302 A | * | 6/1996 | Basoglu et al. | 348/442 |
| 5,722,412 A | * | 3/1998 | Pflugrath et al. | 600/459 |
| 6,370,264 B1 | * | 4/2002 | Leavitt | 382/128 |
| 6,468,213 B1 | * | 10/2002 | Knell et al. | 600/437 |
| 6,701,341 B1 | * | 3/2004 | Wu et al. | 709/200 |

* cited by examiner

*Primary Examiner*—Francis J. Jaworski

(74) *Attorney, Agent, or Firm*—Akin Gump Strauss Hauer & Feld LLP

(57) ABSTRACT

A method of spatial transformation, such as scan conversion, uses a packed data table. The raw data and the data table are read sequentially, and the resulting image is computed.

5 Claims, 13 Drawing Sheets

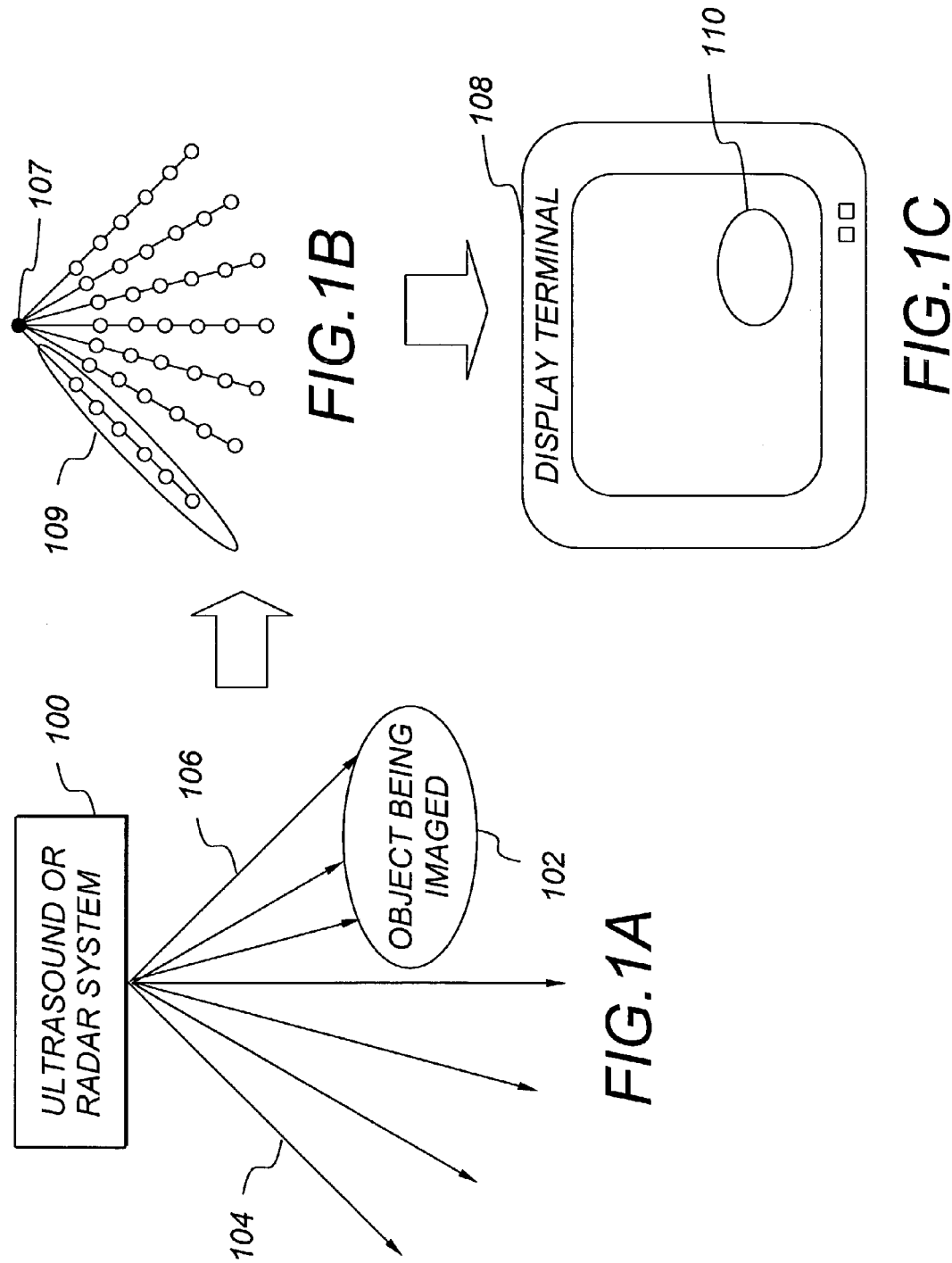

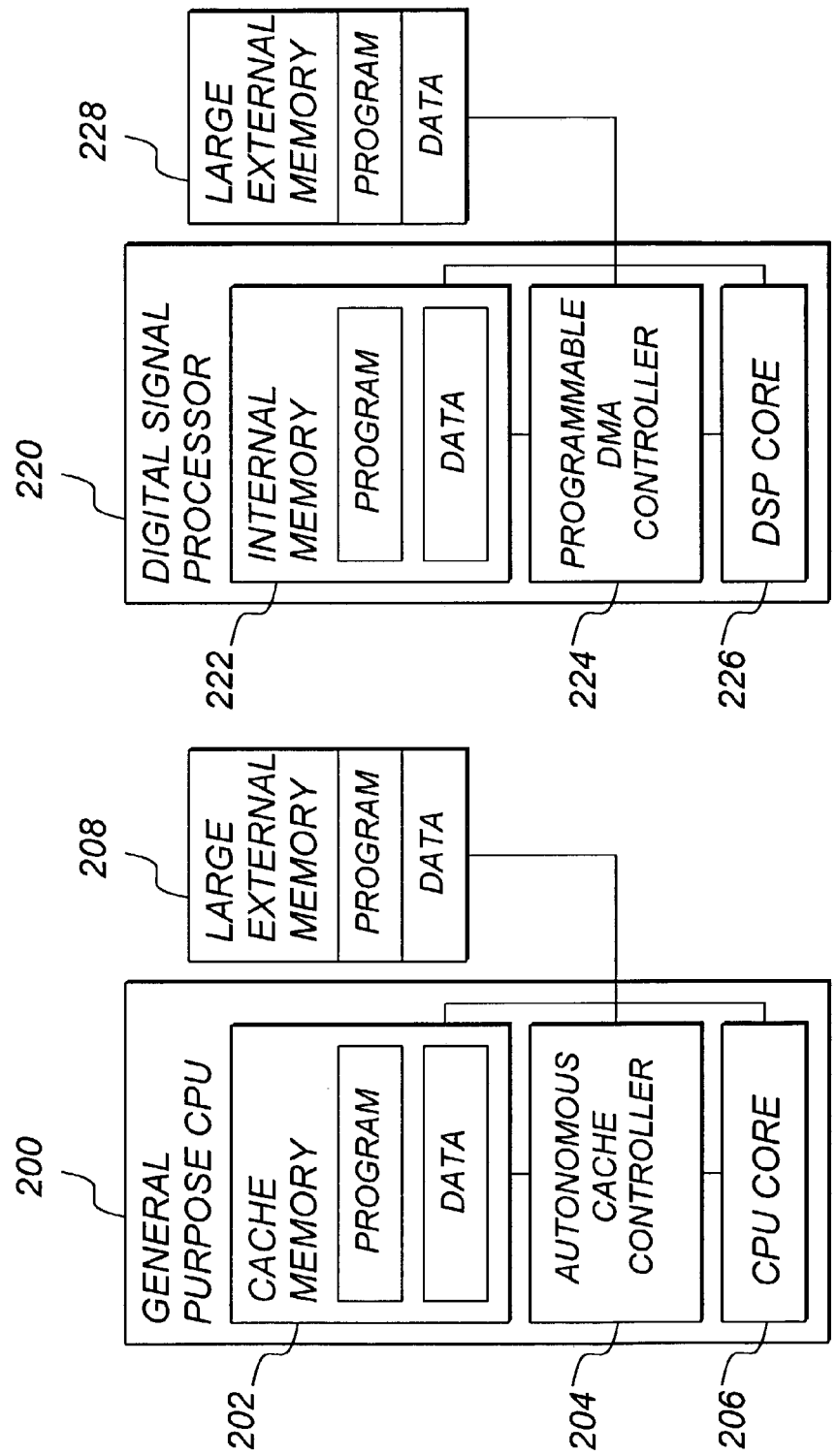

SDRAM RANDOM ACCESS

SDRAM BURST MODE ACCESS

PRIOR ART

METHOD #1

METHOD #2

PDT Entry Format

| Field Name | Bit Length |
| --- | --- |
| EndBit | 1 |
| j (optional) | Varies |
| $n = Q_{m+j}[..]$ | Varies |
| $P_n$ or $Offset(P_n)$ | Varies |

Example PDT Implementation

| Field Name | Bit Length |
| --- | --- |
| EndBit | 1 |
| j | 2 |
| $n = Q_{m+j}[..]$ | 20 |
| $Offset(P_n)$ | 8 |

Bit:  31 - 31  30  29 - 28  27 - 8  7 - 0

[ EndBit |-| j | $n = Q_{m+j}[..]$ | $Offset(P_n)$ ]

FIG.9

OPTIMIZED METHOD OF PERFORMING SPATIAL TRANSFORMATION

BACKGROUND OF THE INVENTION

The present invention relates to a method of performing spatial transformations which is optimized for digital computers. Typical fields which could benefit from the invention include ultrasound, radar, general medical imaging and general image processing.

BACKGROUND OF THE INVENTION

[Note: All reference numerals begin with the Figure number; i.e. numeral 1022 refers to FIG. 10, numeral 701 refers to FIG. 7]

In many electronic imaging applications, such as ultrasound and radar, information about the objects being imaged is acquired in a non-Cartesian coordinate system. FIG. 1A shows a radar or ultrasound system 100, which sends out radial scans 104, 106, in order to build an image of an object 102. The resulting echoes form the raw data (FIG. 1B), which are usually in polar coordinates, relative to an origin 107. Referring to FIG. 1C, an image 110 of the object 102 must be displayed on a display terminal 108, such as a CRT or LCD monitor. In order for the object 102 to be displayed on the display device 108, the data must be converted into the coordinate system of the display device 108, which is often different from the coordinate system of the raw data (FIG. 1B).

A 'scan converter' is the name given to a system which converts raw data from one coordinate system into another.

Scan conversion systems face three challenges: Speed, accuracy, and cost.

In the most common case, the imaging system must run in real-time, and display an image thirty or more times per second. One scan conversion must be performed for each image, so thirty or more scan conversions must be performed each second. The speed of a scan conversion system is defined by the number of images which it can scan convert per second, or, equivalently, the time it takes to scan convert a single image.

Because the raw image data (FIG. 1B) is acquired in a different coordinate system, and very often with a different resolution than the display monitor 108, there is not a simple one-to-one mapping between the raw data points (FIG. 1B) and the points on the display 108. In some areas of the display image, multiple raw data points may map to a single display point; in other areas of the display image, no raw data point will directly map to a display point, leaving 'holes' in the image. These two phenomena can lead to 'artifacts', speckle or blemishes in the resulting image. Further, certain scan converters use various approximations in an attempt to minimize processing and speed up scan conversion. These approximations can further degrade the resultant image. There is usually a trade-off between speed and accuracy.

The most advanced systems achieve real-time speed and also excellent accuracy, at the expense of cost. Such systems are usually unacceptably expensive, due to the enormous computing power they require. Further, existing systems are often inflexible, because either they require custom hardware, or they use a dedicated general purpose CPU or a dedicated DSP processor. If a more efficient method of scan conversion existed, not only would the cost of the required hardware be reduced, but the flexibility of the systems would be increased, because the scan conversion algorithm would use only a fraction of the available computing resources.

As is shown infra, existing systems do not make efficient use of their computing resources. There is a need for a scan conversion algorithm which makes more efficient use of computing resources, thus lowering the cost of the system, and increasing flexibility.

BRIEF SUMMARY OF THE INVENTION

The invention increases the versatility and reduces the cost of scan conversion systems by more efficiently using available computing resources. In particular, the invention provides an algorithm for scan conversion or general spatial transformation that attempts to minimize memory bandwidth, and that reads memory sequentially. The algorithm uses a special data table which is designed to occupy the minimum possibly memory. The raw data and the data table are read sequentially, and the resulting image is computed. This architecture minimizes cache-miss events on general purpose processors, and it minimizes DMA transfers and/or external memory stalls on digital signal processors. Moreover, it results in better performance with random access memories in general.

OBJECTS AND ADVANTAGES

The object of the invention is to provide a method for spatial transformation that provides more versatility than existing systems, on simpler and lower cost hardware.

The method presented makes more efficient use of computing resources, in such a way that on equivalent hardware, the transformation is much faster than existing systems. The greater efficiency of the process allows it to provide functionality equivalent to existing systems, on lower cost hardware.

Examples of prior art addressing the same problem are U.S. Pat. Nos. 4,697,185, 4,471,449, 5,530,450, 5,563,810, 6,140,955, 4,931,801, 5,528,302, 5,904,652, 6,192,164, 6,248,073, 5,519,401 and 5,860,925.

The systems in the listed patents, although they may perform adequately, do not make efficient use of their computing resources, as will be shown in detail hereinafter.

Very efficient systems can be more flexible, because they often do not fully use their computing resources. By not fully using their resources, there is room for the addition of new features, without resorting to new hardware. Frequently, inefficient systems are so expensive to manufacture that they use only the bare minimum hardware necessary for their functioning. This makes them inflexible and difficult to expand.

The object of the invention is to present a method or process for spatial transformation, which makes more efficient use of computing resources, thus allowing for a more cost-effective and flexible system.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 1A shows an ultrasound or radar system;

FIG. 1B shows the spatial arrangement of the raw echo data;

FIG. 1C shows a display terminal;

FIG. 2A shows a block diagram of a typical general purpose processor;

FIG. 2B shows a block diagram of a typical digital signal processor;

FIG. 9 shows details of the PDT entry format, and an example PDT implementation;

DETAILED DESCRIPTION OF THE PREFERRED EMBODIMENTS

Figure 3A:
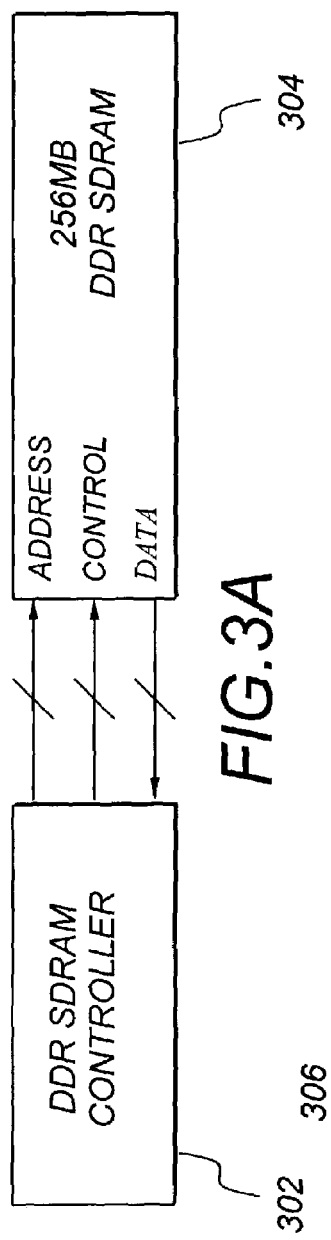
FIG. 3A shows a block diagram of a typical DDR SDRAM with its controller.

In order to explain why the invention makes more efficient use of computing resources than the prior art, certain aspects of CPU, memory and cache architecture must be examined.

Traditionally, computer scientists have analyzed the complexity of algorithms in terms of the number of computations that the algorithm needs to perform. The traditional view assumes that an algorithm that has a 'lower' complexity is faster, because it performs fewer computations. Unfortunately that assumption is no longer accurate. The traditional view neglects the dynamics of computer memories.

Algorithms operate on data, and when implemented on digital computers, those data come from computer memories. Until the early 1990's, computer memories were relatively simple, and they operated synchronously with microprocessors and/or custom hardware. For example, in a truly 'synchronous' computer, mathematical operations execute at some frequency, and each operation's data is immediately available, because the memory is running as fast as the processor. However, as microprocessors and Application Specific Integrated Circuits (ASIC's) became faster and faster, memory began to lag behind. In a system where the CPU is faster than the memory, CPU instructions often 'stall', and wait for their data to arrive from a slow memory. In such systems, the memory is the bottleneck. To compensate for slow memories, various types of 'cache' memories were invented. Cache memories are very small memories which are fast enough to keep up with CPU's.

Processor Architecture

FIG. 2A shows an architectural view of a modern general purpose processor (CPU). The CPU core 206 performs the computations, and is connected to an autonomous (non-user controlled) cache controller 204. The cache controller 204 is connected to both the cache memory 202 and a large, slow external memory 208. The cache memory 202 stores both data and code, and these are often kept in separate areas of the cache 202.

FIG. 2B shows an architectural view of a modern digital signal processor (DSP). The DSP core 226 performs the computations. It is connected to a user-programmable direct memory access (DMA) controller 224, which is connected to both the fast internal memory 222 and a large, slow external memory 228. For convenience, the fast internal memory of the DSP will be also be referred to as a cache memory.

The main difference between the DSP and the CPU is that in the CPU, the cache controller 204 is autonomous, while on the DSP the DMA controller 224 can be controlled by the user.

Cache memories (and their associated controllers 204) attempt to create the illusion of a huge memory, which runs at the speed of the processor core 206.

A cache memory 202, 222 can greatly affect an algorithm which accesses the same data repeatedly. Such an algorithm may be under the illusion that the memory 208, 228 is in fact as fast as the processor 200, 220. Unfortunately, many algorithms access each datum only once. Such accesses are called 'non-temporal' memory accesses. Memory intensive algorithms which access memory non-temporally are ultimately limited by the bandwidth of the external memory 208, 228, and not the cache 202, 222.

Cache memories 202, 222 operate differently in general purpose processors when compared to DSP's. Typically, in a general purpose processor 200, the cache controller 204 is autonomous, and fetches data from main memory 208 using some prediction algorithm. In contrast, DSP processors 220 often allow the programmer to manually control DMA 224 transfers from main memory 228 into the cache 222. This has the advantage that if the processor is only going to execute a few algorithms, the memory transfer between the main memory 228 and the cache 222 can be manually optimized.

At this time, a common PC configuration is a 933 MHz Pentium™ III processor with SDRAM memory running at 100 MHz. At first glance, it appears that the processor run 9.33 times faster than the memory. However, it is even faster than that. The processor can execute several instructions per cycle, and the memory rarely actually reaches 100 MHz×32 bits bandwidth. This is only one example showing the huge speed discrepancy between CPU's and memory.

As a better example, on the same system, executing only one instruction per clock cycle, 933 million instructions could execute in one second (one per clock cycle). However, if an instruction accesses data which is not in the data cache memory 202, the instruction stalls for approximately 100 cycles (a 'cache miss event'). So, such an instruction, instead of executing in one cycle, would take approximately 100 cycles to execute. This effect can be clearly seen by using a CPU analysis program such as Intel™ V-Tune™.

A poorly designed algorithm can cause a cache miss on almost every instruction. Such an algorithm would thus execute 100 times slower than the processor, or at an effective instruction rate of only 9.33 MHz.

On DSP processors 220, the problem is just as bad. With the cache 222 under manual control, a program which accesses memory 228 in a random sequence will not benefit from any DMA transfers, and the programmer may as well access external memory 228 directly, bypassing the cache. For example, on a 200 MHz Texas Instruments™ TMS320C6201, a direct access to external SDRAM (100 MHz) 228 causes the DSP core 226 to stall for approximately 17 clock cycles; however, this processor executes 5-8 instructions per cycle, so a stall of 17 cycles causes a loss of 85-136 instructions. Such an algorithm (accessing external memory 228 continuously) would thus execute 85-136 times slower than expected.

Custom hardware is often used to implement computer algorithms. However, regardless of the type of hardware used, efficient computational logic blocks are always faster than system-level memory. So, a custom hardware approach must either use a small fast memory, creating its own cache, or it must directly access a slow system-level memory. (Both situations have been addressed above).

Sequential Vs. Non-Sequential Memory Accesses

Figure 3B:
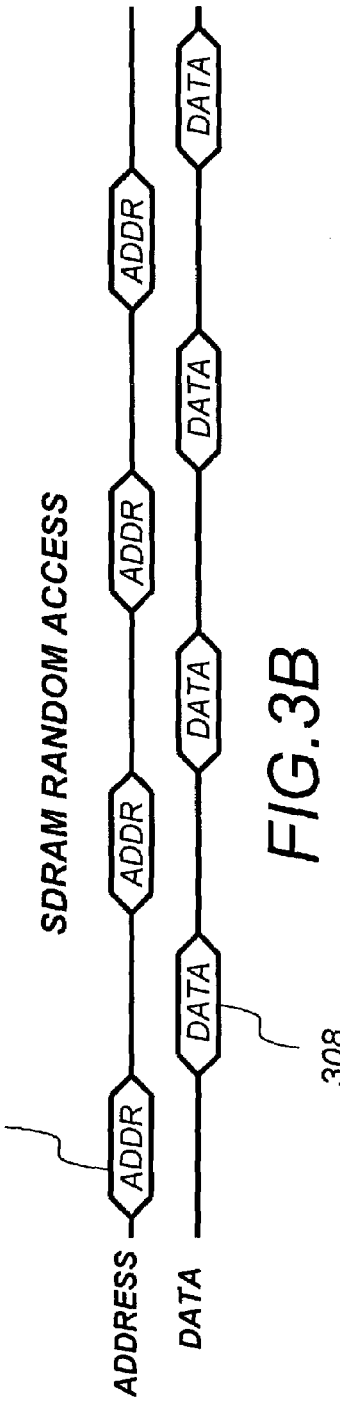
FIG. 3B shows a memory timing diagram for SDRAM in random access mode.
Figure 3C:
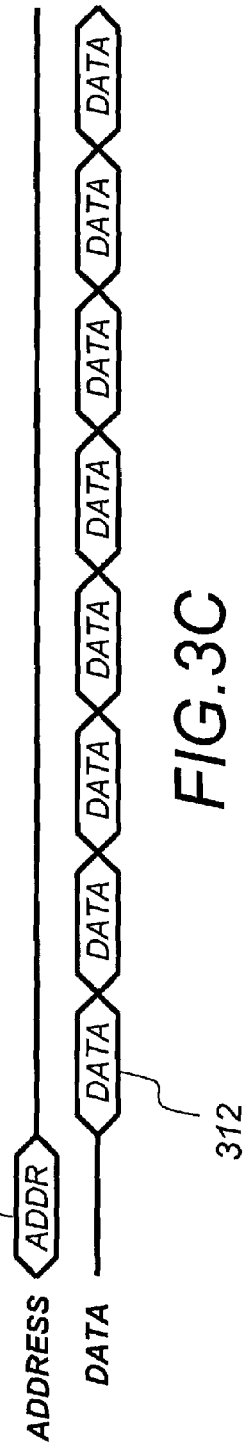
FIG. 3C shows a memory timing diagram for SDRAM in burst mode.

FIG. 3A shows the relationship between a typical 'slow' system-level memory 304 (DDR SDRAM), and the required DDR SDRAM controller 302. Not only is the SDRAM 304 slow, but it is optimized for sequential accesses. FIGS. 3B and 3C show the difference between random access (FIG. 3B) and sequential access (FIG. 3C). Sequential access is also called 'burst mode.' The timing diagrams in FIGS. 3B and 3C omit the control signals for simplicity.

Sequential accesses (FIG. 3C) do not require the repetitive specification of the address to be read 310. The user tells the memory only the starting address 310 to be read, and the number of addresses to be read, and the memory 304 automatically sends the entire block, at the maximum possible speed. Contrast this to non-sequential ('random') accesses (FIG. 3B). When memory 304 is accessed non-sequentially (FIG. 3B), the desired addresses 306 must be transmitted every access, and the memory must spend extra cycles decoding the addresses 306.

The above examples clearly show the need for sequential memory accesses (FIG. 3C), as well as incorporating the dynamics of a cache or DMA setup into algorithm design. A computer scientist who designs his algorithm based solely on 'computational complexity' will seldom find the fastest algorithm, because his algorithm will constantly stall, waiting for data to be fetched from memory. So, the fastest algorithm is not necessarily the least complex computationally.

Several steps are necessary to eliminate or reduce memory stalls, but the primary requirement is sequential memory read-accesses. Non-sequential reads cause huge penalties, as shown above, but non-sequential writes incur only minor penalties. Processors can often buffer and re-order the writes to create sequential writes. Some processors feature specific 'non-temporal store' instructions which are specifically designed for out-of-order write operations. It can be shown that no polar-Cartesian scan conversion algorithm under realistic conditions can perform both sequential reads and sequential writes, so given a choice between the two, sequential reads should be chosen over sequential writes. Unfortunately, all prior art perform either:

1) Non-sequential memory reads, sequential memory writes;
2) Non-sequential memory reads, non-sequential memory writes;

The desirable choice is:
3) Sequential memory reads, non-sequential memory writes.

Sequential memory read-accesses are so important that it is acceptable to increase the mathematical computation and/or the total memory bandwidth if necessary, in order to achieve sequential-read memory accesses.

Once sequential memory read-accesses have been assured, then efforts can be made to minimize total memory bandwidth and computational complexity.

Sequential memory read-accesses are important for non-temporal data (data which is accessed only once), and especially for large data buffers, such as are encountered in the scan conversion algorithm. However, non-sequential read-accesses can be used without severe penalties on very small memory buffers, which easily fit into the data cache. So, the requirement of sequential memory read-accesses applies mainly to large data structures.

The dynamics of computer memories have only recently required changing the design of computer algorithms. Even once the importance of sequential memory read-accesses has been understood, the method by which a spatial transformation or scan conversion algorithm can be implemented with sequential memory read-accesses in not obvious, and is one of the objects of the invention.

The concept of a stream is defined to assist in understanding the invention.

Any series of memory addresses read sequentially can be called a 'stream' or a 'memory stream.'
Definition of sequential read-accesses:
For every memory address 'A' read, the address 'A+1' is read 'soon' after.

The definition of 'soon' depends on the application, but generally 'soon' means within several hundred instructions.

EXAMPLE

Suppose there is a block of memory stored between address A and A+10000.
Suppose the following sequence of reads occurs:
Read address A
Read address A+1000
Read address A+2000
Read address A+1
Read address A+1000+1
Read address A+2000+1
.
.
Read address A+i
Read address A+1000+i
Read address A+2000+i In the above read accesses, there are three separate sets of sequential accesses, one starting at A, one starting at A+1000, and one starting at A+2000; thus, there are three streams.

Thus, the sequence A, A+1, . . . , A+i is one memory stream.

The sequence A+1000, A+1000+1, . . . , A+1000+i is another memory stream.

The sequence A+2000, A+2000+1, . . . , A+2000+i is another memory stream.

The concept is that a single data buffer, for example the raw data buffer, can be read sequentially, as a single memory stream, or it can be read by different interleaved memory streams, where each stream is reading a different part of the buffer.

In the above example, the memory block from A to A+10000 could have represented the raw data buffer. In that case, the three streams, starting at A, A+1000 and A+2000 are all reading the same buffer (the raw data buffer), but each stream reads a different region at any one time.

A stream can be most conveniently referenced by its starting address. Thus, in the above example, the stream which begins at address A is called the 'A stream.' The stream which begins at address A+1000 is called the A+1000 stream.

Figure 4:
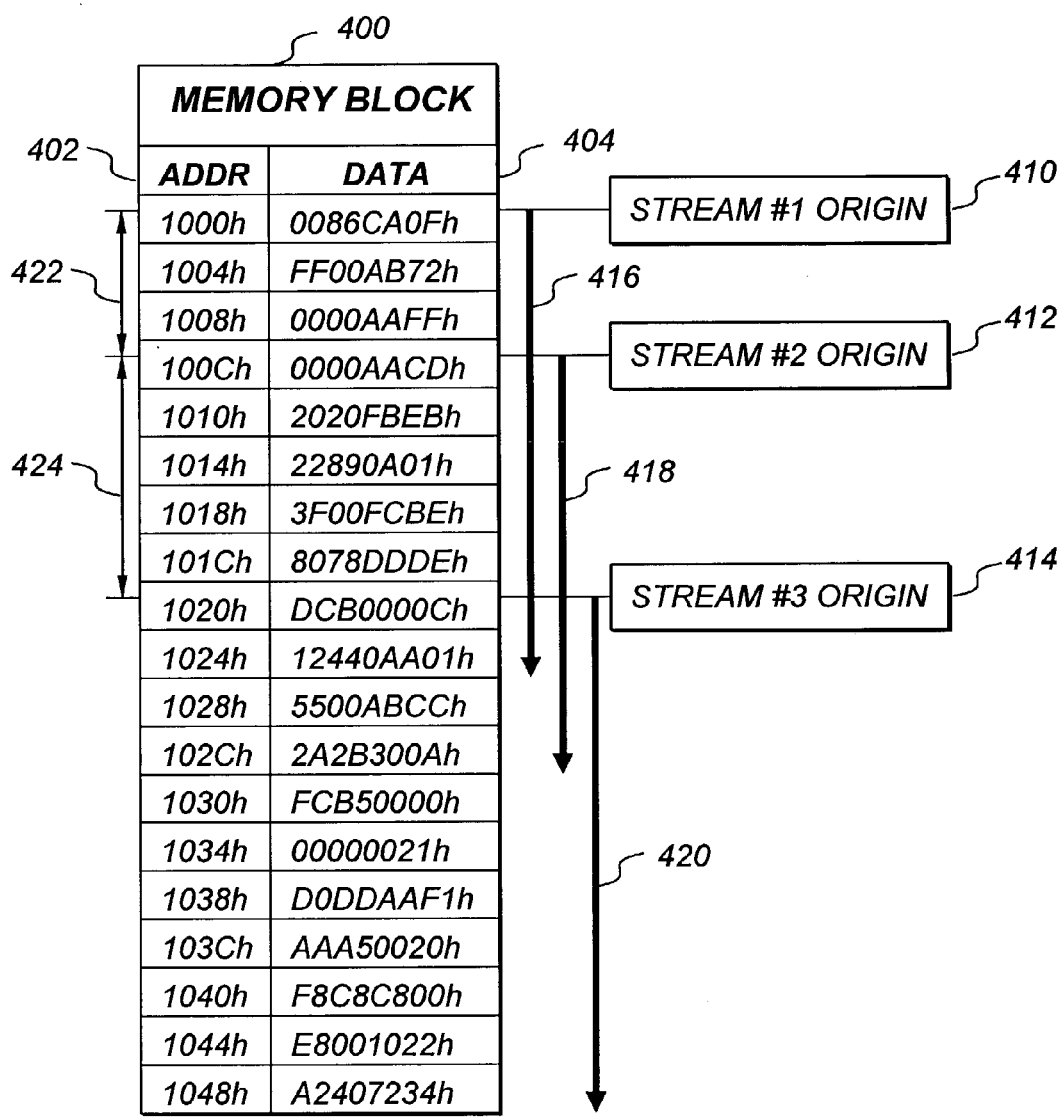
FIG. 4 shows how the concept of a stream relates to a memory block.

FIG. 4 shows a graphical representation of a memory block and three streams. Stream #1 416 begins reading memory at address 1000$h$. This is the origin 410 of Stream #1. As Stream #1 reads its first address at address 1000$h$, Streams #2 418 and Stream #3 420 begin reading at their start addresses 412 and 414, respectively.

If a single buffer has several streams reading from it, such as in FIG. 4, it is possible that one stream 416 will eventually begin reading the data already read by another stream 418. For example, the data at address 101Ch was first read by Stream #2 418. At a later time, Stream #1 416 reads this same address. Depending on the size of the data cache memory, when Stream #1 reaches address 101Ch, the data at that address may still be in the data memory cache, because it was recently read by Stream #2.

The probability that the data at address 101Ch will still be in the data cache when Stream #1 416 reads that address depends, among others thing, upon the separation 422 between the origins of Stream #1 410 and Stream #2 412, as will be shown in more detail below.

The longest distance between two memory streams is defined as the 'maximum stream separation.' In FIG. 4, the maximum stream separation is the maximum of 422 and 424. The separation between two streams has an impact on algorithm performance, as will be described below.

Given two streams which begin at different memory addresses, for example Stream #1 416 and Stream #2 418, the stream which begins at the lower memory address 410 can be termed the 'lower stream', and the stream which begins at the higher memory address 412 can be termed the 'higher stream.'

On a general purpose CPU with an autonomous cache controller, the behavior of the cache can be analyzed with respect to memory streams. As a stream reads from memory, the data it reads will be brought into the data memory cache, and the data will persist in the data cache for some length of time.

When the lower stream reads the data that was previously read by a higher stream, the probability that the data will still be in the cache is proportional to the size of the data memory cache, and inversely proportional to the separation between the streams. Therefore, performance on a general purpose processor will be maximized when the separation between the streams is kept to a minimum.

On a DSP processor with manual DMA control, the DMA can be scheduled to fetch data for each individual stream, in advance. However, if two streams are close enough together, a single DMA transfer can fetch the data for both streams, minimizing the number of DMA transfers needed. So, on DSP processors, as with general purpose processors, minimizing the separation between streams favors optimal performance.

It has already been demonstrated that optimal performance of an algorithm requires both sequential read-accesses on large buffers, as well as minimum distance between memory streams.

The time to perform a series of sequential memory accesses is limited by the total amount of data that needs to be transferred. Thus, the total amount of data transferred, called the 'total memory bandwidth' of the algorithm, should also be minimized.

Further, the concept of computational complexity still holds some merit. Achieving sequential memory accesses with minimum memory bandwidth is useless if a large number of computations are required to support such an algorithm.

So, in summary, an efficient algorithm must satisfy four constraints:

Constraint #1: The algorithm must access large memory buffers sequentially.

Constraint #2: Separation between streams must be minimized.

Constraint #3: The memory bandwidth of the algorithm must be minimized.

Constraint #4: The computational complexity of the algorithm must be minimized.

The ideal algorithm would satisfy all four constraints. In practice, this is seldom possible. Instead, compromises must be made, and each of the four constraints must be addressed as best as possible, to maximize the speed of the algorithm.

Memory Arrangement

Referring again to FIGS. 1A, 1B and 1C, the most common situation in ultrasound and radar applications involves raw data (FIG. 1B) acquired in polar coordinates, which must be displayed in Cartesian coordinates on the display device 108. The prior art deals only with the polar-Cartesian problem, which is an important one. However, the present invention relates to a more general class of spatial transformations.

FIG. 1A shows an object 102 of arbitrary shape which must be imaged.

The radar or ultrasound machine 100 scans the object by sending out radial pulses 104, 106, and the resulting echoes form the raw echo data (FIG. 1B), referred to as the raw data (FIG. 1B). The raw data (FIG. 1B) is acquired in a polar coordinate system, with the radar or ultrasound machine 100 near the origin 107. The raw data (FIG. 1B) is stored in a memory. The data 109 from a single radial scan 104 is stored in the memory, contiguously, followed by contiguous data from an adjacent scan, and so on, until the data from every scan has been stored. The data from each radial scan is referred to as a scan line 109. Throughout the discussion, the number of data points on a single radial line 109 will be assumed to be L. The total number of raw data points will be assumed to be M, and these data points will be individually referred to by $S_m$, where m varies from 0 to M−1.

The Concept of the Implicit Neighborhood

Figure 5:
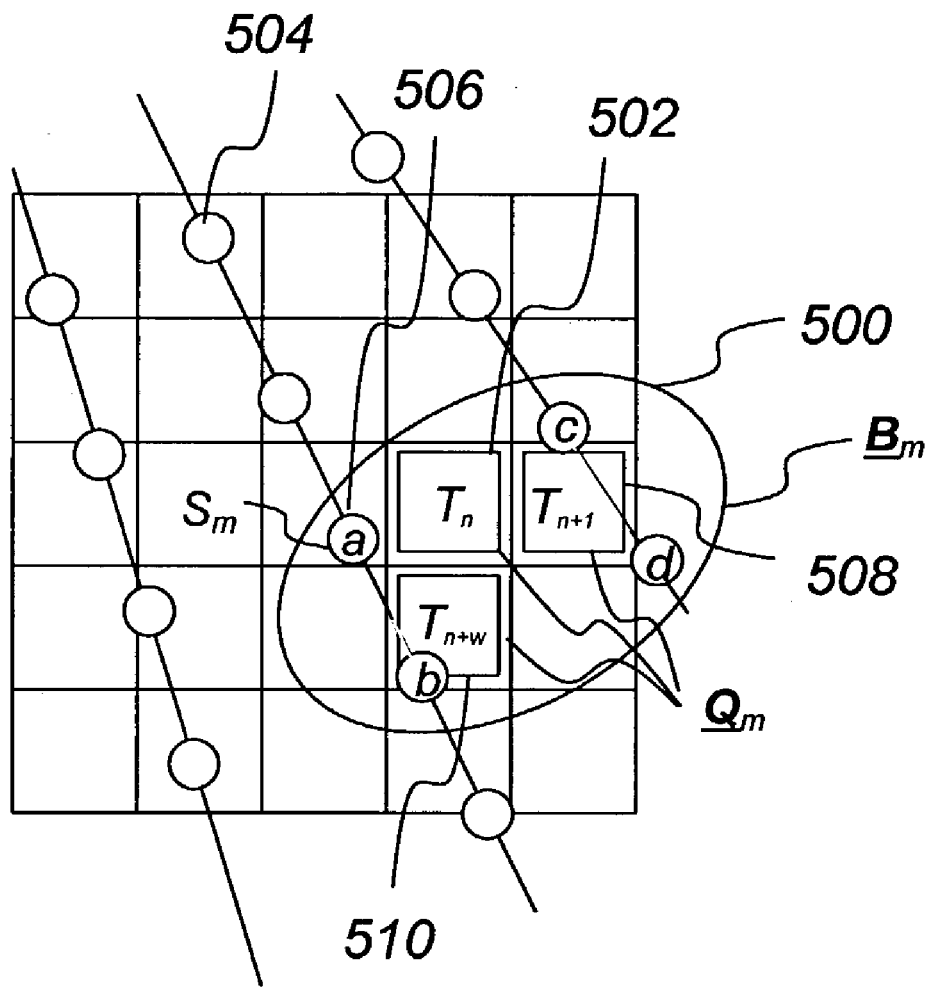
FIG. 5 shows the relationships between the raw data points and the display points.

FIG. 5 shows the raw data of (FIG. 1B) superimposed over the Cartesian pixels of the display 108.

The display device 108 is accessed in Cartesian coordinates, by writing to a memory called the display buffer. The display device 108 is assumed to have N pixels, where each individual pixel is referred to by $T_n$ 502, where n varies from 0 to N−1.

The raw data (FIG. 1B), 504 must be transformed from polar coordinates to Cartesian coordinates, and the Cartesian data must be written to the display buffer, in order to display the image on the display device 108.

Every point $T_n$ 502 on the display device 108, is a function of a set of points $B_m$ 500 in the raw data (FIG. 1B). In FIG. 5, the set $B_m$ is composed the points marked 'a', 'b', 'c', 'd' and enclosed by the oval. The size, location and orientation of the set of points $B_m$ 500 depends on the type of interpolation algorithm being used.

The point $T_n$ 502, on the display device 108, exists in the Cartesian domain, while the set of points $B_m$ 500, in the raw data (FIG. 1B), exists in the polar domain. An additional point $S_m$ 506 can be selected in the raw data (FIG. 1B), near the set of points $B_m$ 500, where $S_m$ 506 itself may or may not belong to the set of points $B_m$ 500. For the purpose of this description, the point $S_m$ 506 is called the 'seed point', and the set of points $B_m$ 500 is called the 'Implicit Neighborhood $B_m$ of $S_m$.' The implicit neighborhood $B_m$ 500 can be of any shape and size, and does not have to be contiguous or symmetrical.

Figure 6B:
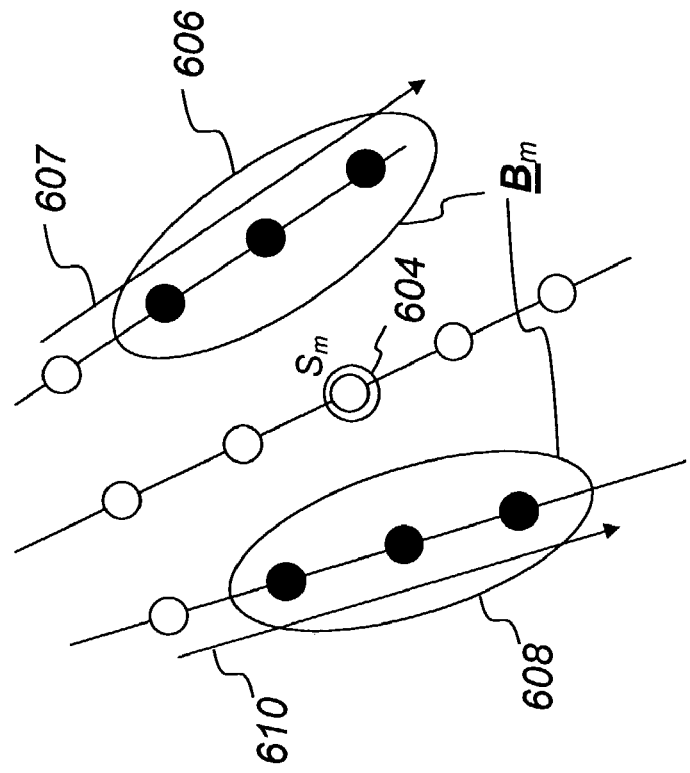
FIG. 6B shows a second example of a seed point and its implicit neighborhood.
Figure 6A:
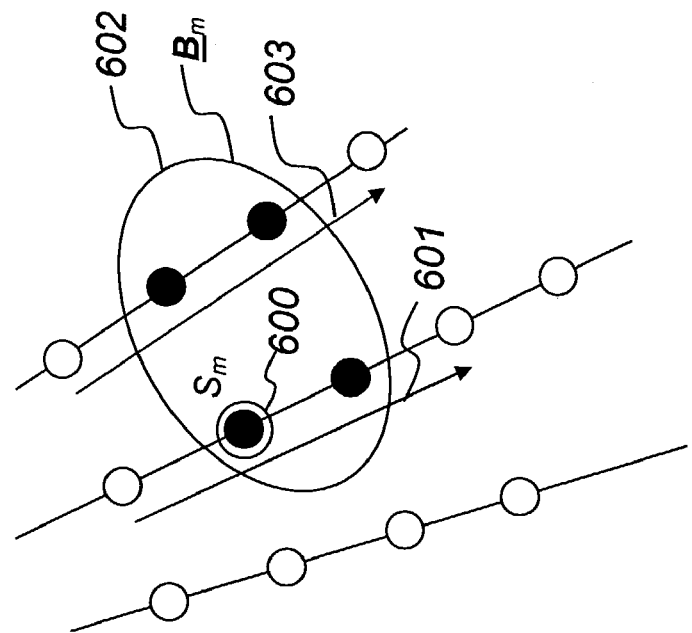
FIG. 6A shows an example of a seed point and its implicit neighborhood.

FIGS. 6A and 6B show example implicit neighborhoods. In FIG. 6A, the implicit neighborhood $B_m$ 602 of the seed point $S_m$ 600, is comprised of the four dark disks enclosed within the oval of FIG. 6A.

The configuration of the implicit neighborhood $B_m$ 602 depends on what sort of interpolation system the algorithm is using; various such systems have been developed and are being developed, and the present embodiment places no constraints on which interpolation technique is used, except that different interpolation techniques require different implicit neighborhoods 602. The points which make up the implicit neighborhood are always relative to the seed point $S_m$ 600. When the seed point changes, the implicit neighborhood 602 changes, such that the geometrical relationship of the implicit neighborhood 602 with respect to the seed point 600 remains the same. The concept of the implicit neighborhood parallels the concept of a structuring element in morphology theory.

The seed point $S_m$ 600 does not necessarily belong to the implicit neighborhood of $S_m$ 600. FIG. 6B shows such an example. In FIG. 6B, the seed point $S_m$ 604 does not belong to the implicit neighborhood $B_m$, where $B_m$ is composed of the union of 606 and 608.

Referring back to FIG. 5, every point $T_n$ 502 on the display device 108 has a corresponding seed point $S_m$ 506 in the raw data (FIG. 1B), such that the value of the point $T_n$ 502 is a function of the implicit neighborhood $B_m$ 500 of $S_m$ 506. More than one point $T_n$ 502 on the display device 108 may have the same seed point $S_m$ 506. So, for each point $S_m$ 506 in the raw data, a set of points $Q_m$ is defined (see FIG. 5), which is composed of the set of points T 502, 508, 510 which are all functions of the implicit neighborhood $B_m$ 500 of the point $S_m$ 506. In FIG. 5, the set $Q_m$ is composed of only three points, $T_n$, $T_{n+1}$, and $T_{n+w}$, where w is the number of radial scans 109 in the raw data (FIG. 1B).

Thus, a point $T_n$ 502 is in the set $Q_m$ 508, if and only if $T_n=F_n(B_m)$, where $F_n(\ )$ is a function whose form is specific to the point $T_n$ 502.

Although each point $T_n$ 502 depends on some implicit neighborhood $B_m$ 500, via a functional relationship $T_n=F_n(B_m)$, it is not practical to have totally different functions for each point $T_n$ 502. It is more practical to use the same function $F(\ )$, for every point $T_n$ 502. The function $F(\ )$ can be customized for the point $T_n$ 502 by including some specific parameters $P_n$ as arguments to $F(\ )$, where $P_n$ is a vector of parameters specific to $T_n$ 502. Thus, in FIG. 5, the points $T_n$, $T_{n+1}$ and $T_{n+w}$ would each have their own parameter vectors $P_n$, $P_{n+1}$ and $P_{+w}$, which would in a sense inform the function $F(\ )$ how to compute the intensity of the pixels located at $T_n$, $T_{n+1}$, and $T_{n+w}$, based on the points 'a', 'b', 'c' and 'd' comprising the implicit neighborhood $B_m$.

The relationship between a point $T_n$ 502 and its implicit neighborhood $B_m$ 500, and its parameters $P_n$, can be written:

$$T_n=F(B_m, P_n)$$

As an example, illustrated by FIG. 5, the implicit neighborhood $B_m$ can be expressed as follows:

$$B_m=[a\ b\ c\ d]$$

Thus, $T_n$ 502 can be computed as follows:

$$T_n=F(B_m, P_n)=F(a, b, c, d, P_n)$$

If we consider the parameters $P_n$ as being a set of 4 numbers $$P_n=[P_{a,n}\ P_{b,n}\ P_{c,n}\ P_{d,n}]$$

then one possible function F could be an interpolation function, in which case:

$$T_n=F(a, b, c, d, P_n)=P_{a,n}*a+P_{b,n}*b+P_{c,n}*c+P_{d,n}*d$$

$$T_{n+1}=F(a, b, c, d, P_{n+1})=P_{a,n+1}*a+P_{b,n+1}*b+P_{c,n+1}*c+P_{d,n+1}*d$$

$$T_{n+w}=F(a, b, c, d, P_{n+w})=P_{a,n+w}*a+P_{b,n+w}*b+P_{c,n+w}*c+P_{d,n+w}*d$$

In that same example, and referring again to FIG. 5, set $Q_m$ 508 can be expressed as $$Q_m=[n, n+1, n+w]$$

Thus, more generally, if set $Q_m$ 508 contains i elements we have $$T_{Qm[0]}=F(B_m, P_{Qm[0]})$$

$$T_{Qm[1]}=F(B_m, P_{Qm[1]})$$

$$T_{Qm[i-1]}=F(B_m, P_{Qm[i-1]})$$

This illustrates that the set $Q_m$ can be considered a vector of variable length, where $Q_m[0]$, $Q_m[1]$, $Q_m[2]$ . . . contain the subscripts of the T points.

As a further example, suppose we choose a point $S_{166}$ in the raw data (FIG. 1B). The point $S_{166}$ corresponds to the 166th point in the raw data (FIG. 1B). The point $S_{166}$ has an implicit neighborhood $B_{166}$, comprised of several points in the raw data (FIG. 1B). There exist several Cartesian points T which depend on the implicit neighborhood $B_{166}$. That set of T points is described by the set $Q_{166}$. Thus, the set $Q_{166}$ holds a list of T points. For example, suppose the set $Q_{166}$ has 5 members with the following values:

$Q_{166}[0]=567$
$Q_{166}[1]=568$
$Q_{166}[2]=1067$
$Q_{166}[3]=1068$
$Q_{166}[4]=1570$

The above information tells us that the set Q is comprised of the following points:

$T_{567}$
$T_{568}$
$T_{1067}$
$T_{1068}$
$T_{1570}$

And we define the operator:
sizeof(Q)=number of T points in the set Q
In this example, sizeof($Q_{166}$)=5

Previous Approaches to the Polar-Cartesian Problem

Figure 7A:
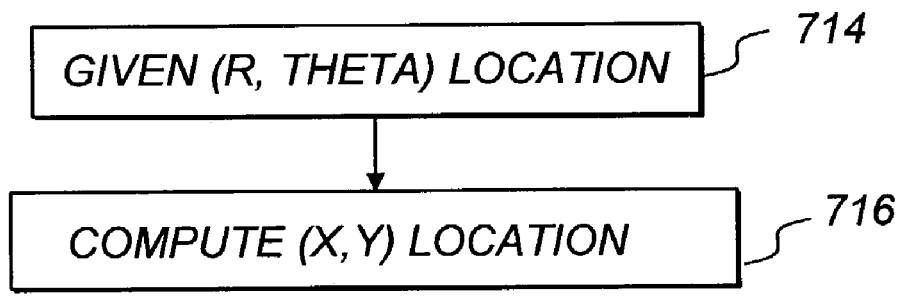
FIG. 7A shows the basic principle behind one method of the prior art.
Figure 7B:
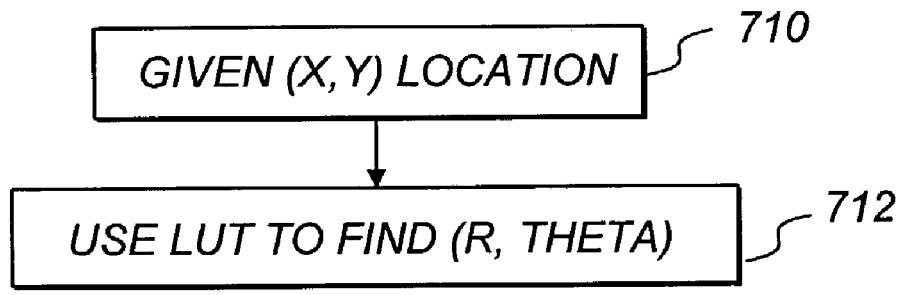
FIG. 7B shows the basic principle behind another method of the prior art.

Given that there is vector data in (r, theta) coordinates, which must be converted to Cartesian (x,y) coordinates, two general approaches are possible, which are summarized in FIGS. 7A and 7B.

In method 1 (FIG. 7A), for some group of (r,theta) data points 500, the nearest (x,y) point(s) 502, 508, 510 on the display 108 are found, and set to values based on the group of (r, theta) data points 502, 508, 510.

In method 2 (FIG. 7B), for each (x,y) point 502 on the display 108, the nearest (r, theta) point(s) 500 in the raw data (FIG. 1B) are found, and the value of the (x,y) point 502 is computed based on the (r,theta) point(s) 500.

Examples of prior U.S. patents which use Method #1 (FIG. 7A) include U.S. Pat. Nos. 4,697,185, 4,471,449, 5,530,450, 5,563,810, and 6,140,955. Examples of prior art which use Method #2 (FIG. 7B) include U.S. Pat. Nos. 4,931,801, 5,528,302, 5,904,652, 6,192,164, and 6,248,073. Examples of hybrid systems (a combination of both methods, or alternative methods) include U.S. Pat. Nos. 5,519,401 and 5,860,925.

Typically, previous approaches using Method #1 (FIG. 7A) would perform all the calculations in real time, and thus often needed dedicated hardware to achieve adequate speed. Method #2 (FIG. 7B) was a breakthrough; by computing the mapping in advance, a look-up-table (LUT) was generated, which replaced most of the real-time calculations by memory accesses. By performing the mapping in advance, arbitrarily complex methods of interpolation and 'artifact' correction could be done, resulting in an improved image. Method #2 (FIG. 7B) thus solved the problems of accuracy. Method #2 (FIG. 7B) was also efficient enough to allow a purely software based scan conversion system to work in real-time.

Typically, the raw data (FIG. 1B) consists of about 200,000 data points, each stored at 8-bit (or higher) accuracy. The display 108 typically has about 200,000 pixels in the active area, stored at 8-bit (or higher) accuracy. The number of raw data points (FIG. 1B) can be different from the number of pixels on the display 108, even though for the purpose of this example they are the same.

A simplified representation of the core algorithm of Method #2 (FIG. 7B) can be represented in a simple loop in the C language:

```
for( i = 0; i < 200000; i ++ )
{
    Display[i] = F( RawData[LUT[i] ] );
}
```

The relationship between the raw data (FIG. 1B) and the display points 108 has been precalculated in the LUT data structure. This drastically reduces the number of computations required, however every element of the look up table, LUT[i] represents an arbitrary offset into the raw data (FIG. 1B). This results in non-sequential memory accesses.

Suppose that the above loop executes 10 assembly language instructions per iteration, at a rate of one instruction per clock cycle, at 1000 MHz. Then, the time for the whole loop should be: 10 instructions/iteration*200,000 iterations*1 ns/instruction=2,000,000 ns=2 ms So, in theory, the above hardware with the above algorithm could scan convert one image in 2 ms. However, in practice, the same hardware and the same algorithm actually take approximately 10 to 15 times longer to execute (20-30 ms). This is because the LUT access on each loop causes a cache miss on almost every iteration; the cache miss takes about 100 cycles to resolve, so the result is that one iteration takes about 110 clock cycles to execute instead of the predicted 110 cycles. At 110 cycles per iteration, the time for scan conversion would be 22 ms, very close to the 25 ms actually measured for the above configuration. At 22-25 ms per scan conversion, the system meets the requirement of 30 frames per second, and thus runs in 'real-time.' However, given that the algorithm is executing more than 10 times slower than predicted, it is obviously not using the computing resources efficiently. Furthermore, it does not allow for further image processing on the same platform.

From the above analysis, it is clear that the repetitive 'cache miss events' are dominating the computing resources. Approximately 100 of every 110 cycles (91%) is spent resolving cache misses. Clearly if the cache misses could be reduced or eliminated, the algorithm would execute much faster, even if the number of computations were slightly increased.

It is important to note that the above algorithm would not cause a significant number of cache miss events if the processor data cache were larger than all the data areas read and written to by the algorithm. In practice, processors with enormous data caches do exist, but they are extremely expensive and so they cannot be used to reduce the cost of the system.

If the above algorithm were executed on a DSP processor with manual DMA control, execution would still be approximately 10-15 times slower than predicted, although the exact mechanism of failure is slightly different ('external memory stalls' instead of 'cache miss events.') The term 'memory stall' will be used to generically refer to the two types of stalls which occur on general purpose CPU's (cache misses) and DSP's (external memory stalls).

A scan conversion process will now be presented which satisfies the four constraints much more so than previous approaches. In particular, a scan conversion process will be presented which achieves sequential read accesses on large buffers, and which attempts to minimize memory bandwidth.

The process of the invention is a derivative of method #1 (FIG. 7A), however the invention uses a precomputed relationship between the two spatial domains, such as is used in method #2 (FIG. 7B).

A constraint on the process is that the raw data (FIG. 1B) must be read sequentially, possibly by several streams simultaneously. FIG. 6A shows an example of the raw data (FIG. 1B) being read sequentially by two different streams 601, 603 simultaneously. FIG. 6B shows another example of the raw data (FIG. 1B) being read sequentially by two different streams 610, 607 simultaneously.

As the raw data (FIG. 1B) is read sequentially by several streams simultaneously, the precomputed relationship between the two spatial domains (i.e. polar/Cartesian) must also be read from memory sequentially. A special kind of data structure can be used for that purpose. It has been named the 'Packed Data Table' (PDT). The term 'Packed' is used because the data table compresses as much information as possible into as little memory as possible, to reduce memory bandwidth, while maintaining sequential read accesses.

Figure 8:
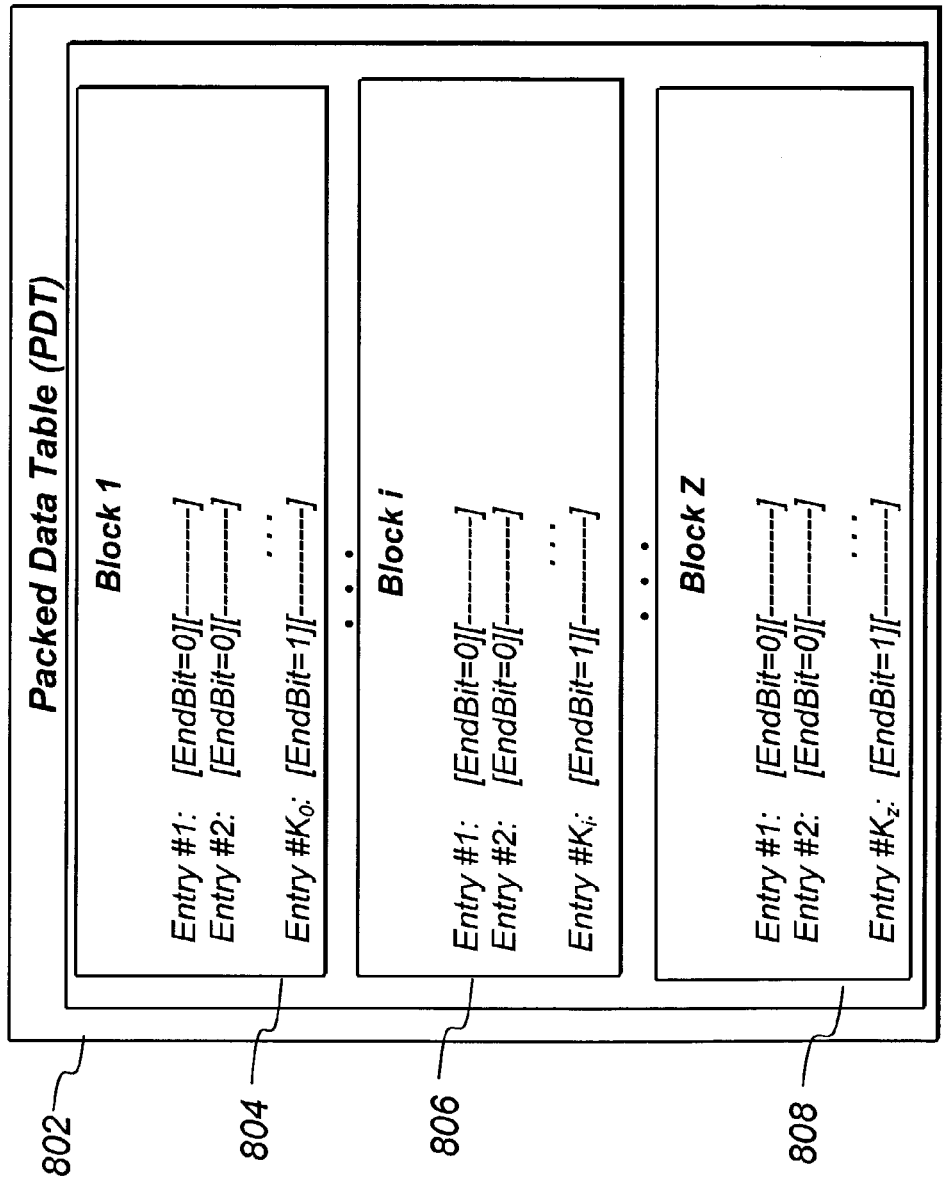
FIG. 8 shows a high-level block diagram of the packed data table (PDT)

FIG. 8 shows the high-level architecture of the PDT.

Each entry in the PDT is a fixed width, for example 32 bits. Each entry in the PDT holds information in the same format. The format of each entry is described below.

As the process loads the PDT sequentially, it loads the raw data sequentially (possibly by several streams). During a single iteration, the method can load a single implicit neighborhood $B_m$ from the raw data, or it can load several implicit neighborhoods simultaneously, to increase efficiency. The number of implicit neighborhoods loaded from memory, per iteration, is called 'J'. So, if J=1, then a single implicit neighborhood $B_m$ is loaded during one iteration of the process. If J=4, then four implicit neighborhoods $B_m$, $B_{m+1}$, $B_{m+2}$, $B_{m+3}$ are loaded during one iteration. For an arbitrary J value, 'J' implicit neighborhoods $B_m$, $B_{m+1}$, ..., $B_{m+J-1}$, are loaded during a single iteration. The value of J affects the format of the PDT. When J=1, the PDT is simpler, and the process itself is simpler. When J>1, the PDT is more complicated, and the process is more complicated, but when J>1 the process is also more efficient.

The PDT is divided into 'Z' blocks, where a 'block' is a group of entries which are classed together because they hold precomputed data for the same set of J implicit neighborhoods $B_m$, ..., $B_{m+J-1}$. The total number of blocks Z is:

$$Z = M/J$$

Where M is the total number of points in raw data buffer (FIG. 1B), and J is the number of implicit neighborhoods loaded from the raw data per iteration of the algorithm.

Each block contains several entries, where the number of entries $K_i$ in the $i_{th}$ block depends mainly on the size of the Q sets:

$$K_i = \max\left(1, \sum_{j=0}^{J-1} sizeof(Q_{i+j})\right)$$

The above equation basically says the following:

Each block of the PDT deals with J implicit neighborhoods

For each implicit neighborhood $B_m$, there is one entry in the PDT for each element in the corresponding set $Q_m$ In the odd case that all the sets $Q_m, Q_{m+1}, \ldots, Q_{m+J-1}$ are empty (0 elements), there must still be at least one entry in the current block of the PDT, which exists only to indicate the end of the block.

The total number of entries G in the PDT is simply the sum of the number of entries $K_i$ in each of the Z blocks:

$$G = \sum_{i=0}^{Z-1} K_i$$

Every entry in the PDT has a field called the 'EndBit' which indicates the end of a block. As shown in FIG. 8, the last entry in each block has EndBit=1, all other entries have EndBit=0.

Packed Data Table

FIG. 9 shows possible formats of a single entry in the PDT. One single entry in the PDT applies to the computing of one display point $T_n$. One PDT entry provides the following information:

EndBit: set to 1 in the last PDT entry of the block; indicates that the algorithm is finished with the set of implicit neighborhoods currently loaded.

j: optional parameter between 0 and J−1; indicates which currently loaded implicit neighborhood should be used to calculate the value of the pixel $T_n$. If J=1, then only one implicit neighborhood is currently loaded, and 'j' is not needed.

n: offset of the display point $T_n$ which is being computed. When the PDT itself is being computed, the n-value will be set to the value of a particular element in the vector $Q_{m+j}[]$.

$P_n$ or Offset of $P_n$: The parameter vector, or the LUT offset of the parameter vector, used as an argument to the function F( ), to compute the value of the display pixel $T_n$.

Thus, the PDT entry gives the following information to compute $T_n$ as described earlier:

$$T_n = F(B_m, P_n)$$

But $n = Q_{m+j}[\ldots]$, so $$T_{Q_{m+j}[\ldots]} = F(B_m, P_{Q_{m+j}[\ldots]})$$

One important factor concerning the packing of these fields into a table entry is packing efficiency. Ideally, each field is represented by the minimum number of bits necessary, and the sum of the data widths of all the fields equals the bit-width of the table entry. For example, if a table entry is 32-bits wide, then all 32-bits should be filled with essential data. If only 15-bits are needed for essential data, then the bit-width of a table entry should be reduced to 16-bits, and a single bit would be left unused. The number of unused bits must be minimized, because every unused bit results in wasted memory bandwidth and slower performance.

The parameter vector $P_n$ can be embedded directly in a PDT entry if it is small. If it is larger, a small LUT is preferably used, where only the LUT offset of the parameter vector $P_n$ is kept in the PDT, and the LUT retrieves the true parameter. This LUT must be kept very small, a fraction of the size of the data cache, in order to minimize cache misses or DMA transfers.

Mechanics of the Process

FIGS. 10A, 10B, 11A, 11B, show the process of the invention.

Figure 10A:
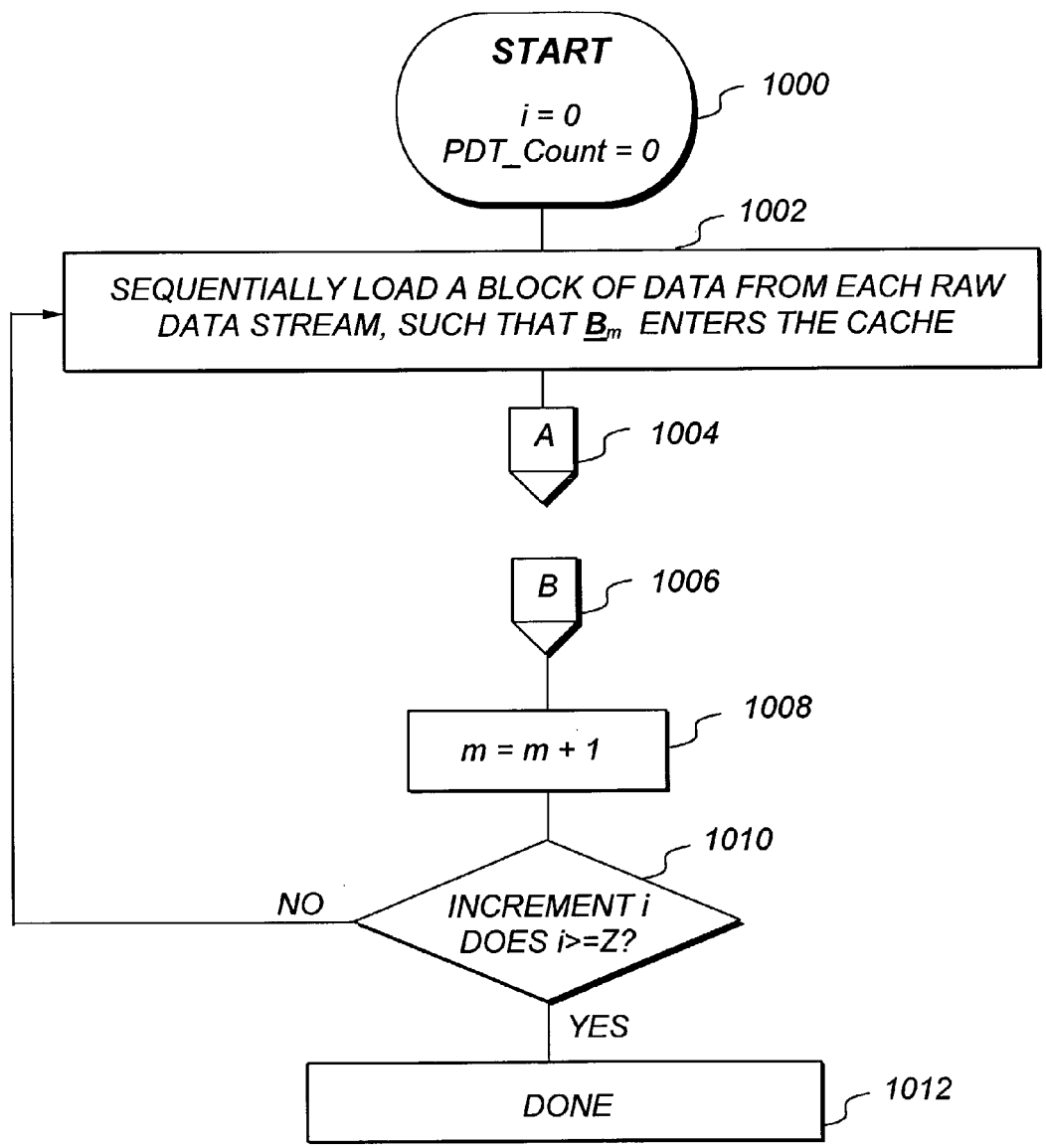
FIG. 10A shows a part of the flow chart of the process of the invention, for J=1.
Figure 10B:
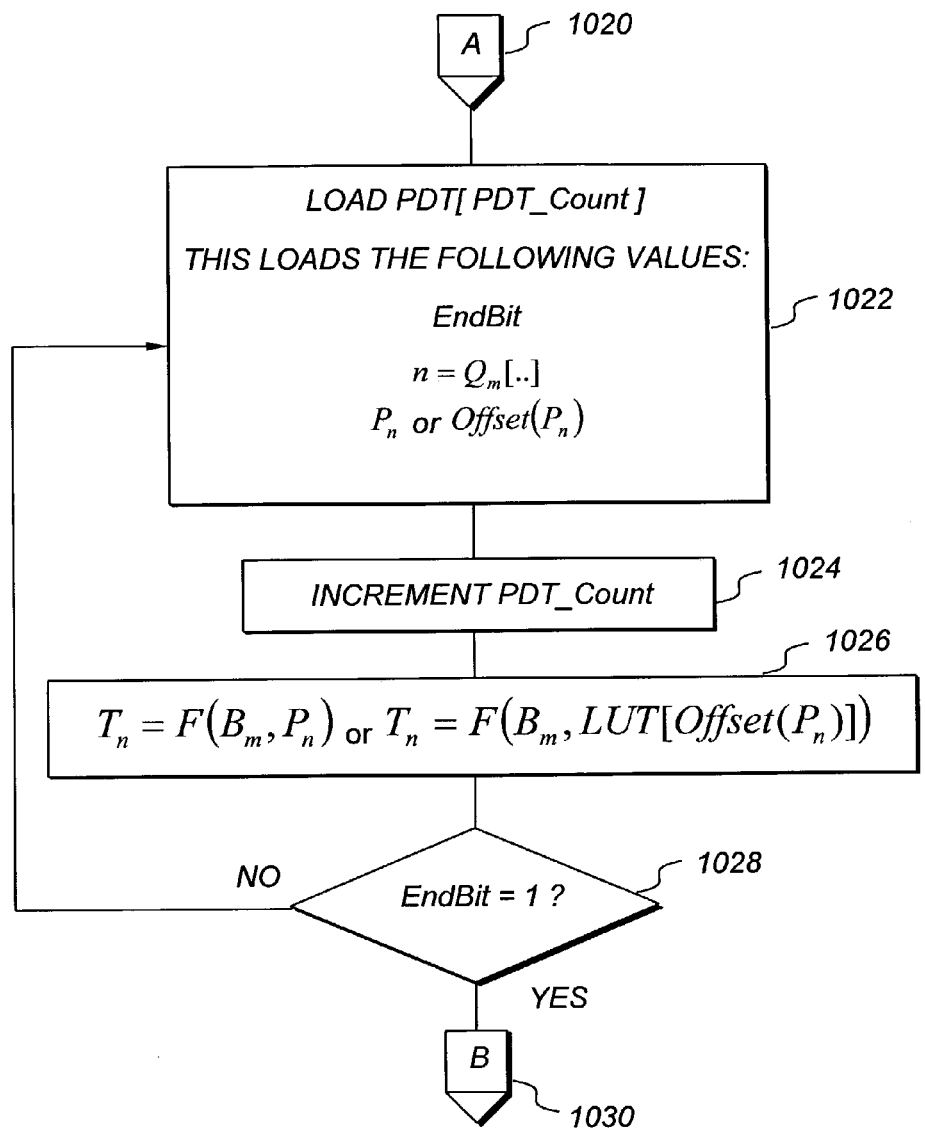
FIG. 10B shows the other part of the flow chart of the process of the invention, for J=1.
Figure 11A:
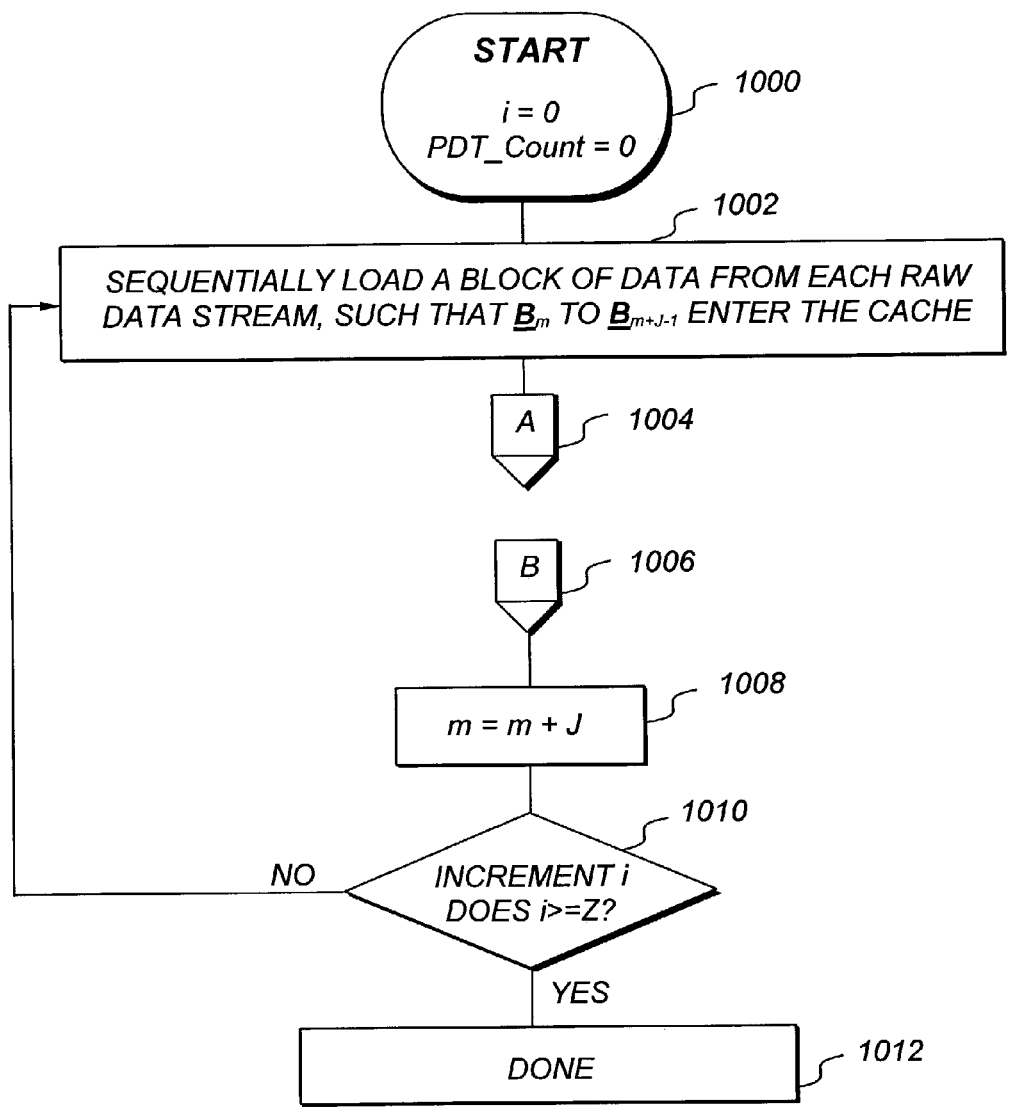
FIG. 11A shows a part of the flow chart of the algorithm of the invention, for J>1.
Figure 11B:
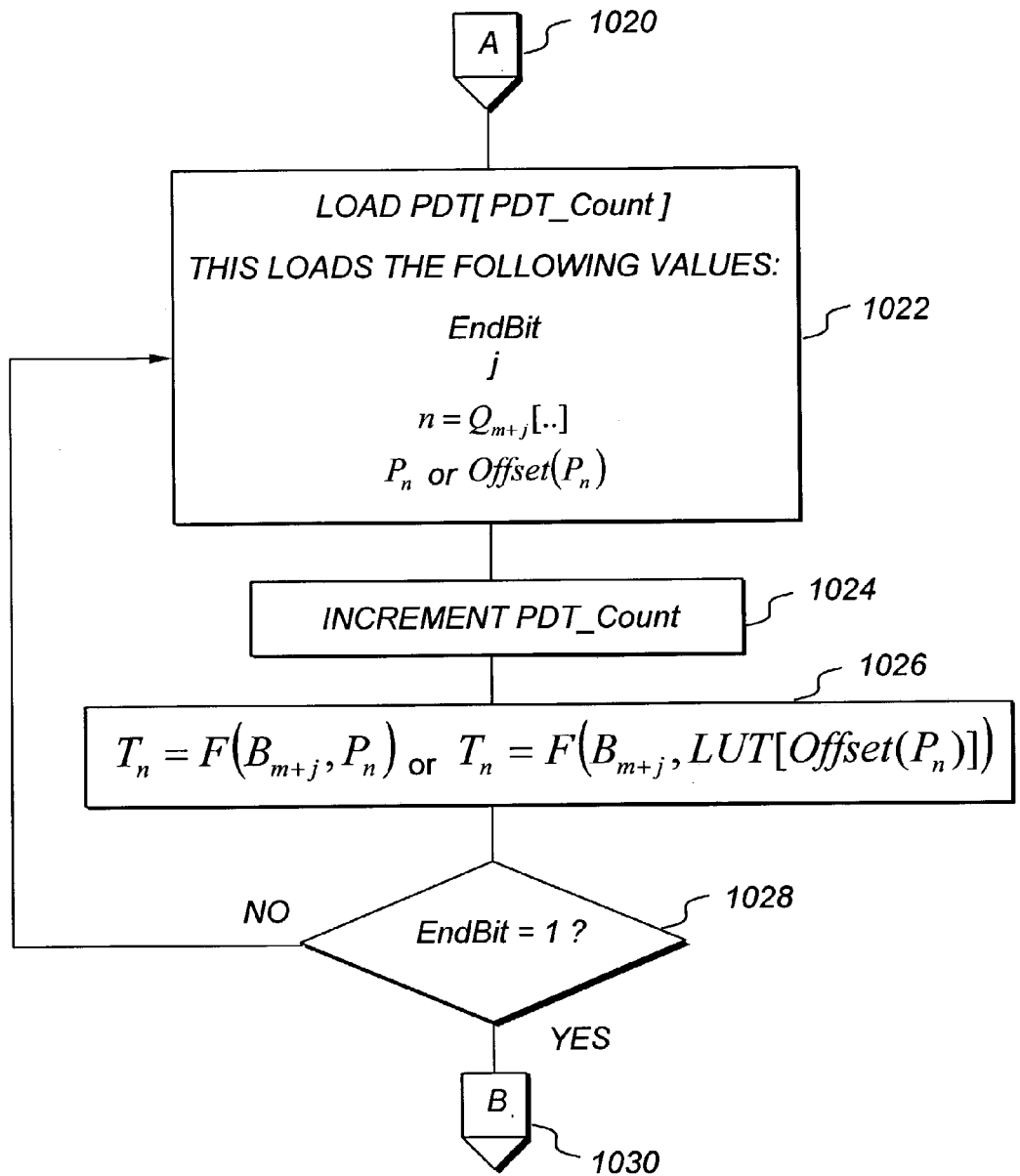
FIG. 11B shows the other part of the flow chart of the algorithm of the invention, for J>1.

FIGS. 10A and 10B show the process of the invention for J=1. FIGS. 11A and 11B show the algorithm of the invention for J>1.

The process reads the raw dataset sequentially, while simultaneously reading the PDT sequentially. These two provide sufficient information to compute the values of display pixels, which are written to the display buffer non-sequentially.

The non-sequential buffer writing is done efficiently as the writes can be rearranged to sequential writes by the CPU or DSP and can be performed in the background, while other operations are being executed.

Referring to FIG. 11A, initially 1000 the two main counters, i and PDT_Count, are set to zero. 'i' is the loop counter which counts from 0 to Z−1, where Z=M/J, and PDT_Count tracks the current position in the PDT. Next, 1002, a block of data is loaded from each raw data stream, such that J implicit neighborhoods enter the cache. Extensive processing is then done, as will be shown below. Once the processing has been completed, 1008, m is incremented by J, and then 1010 the main loop counter 'i' is incremented. If i is equal to or greater than Z, the process is done, otherwise execution jumps back to 1002, and again a block of data is loaded from each raw data stream, bringing another J implicit neighborhoods into the cache.

Once the set of implicit neighborhoods is loaded into the cache, execution continues as shown in FIG. 11B 1022. A single entry of the PDT is loaded, and then 1024 the current PDT index PDT_Count is incremented. The entry of the PDT is decoded 1022 into EndBit, n, j, $P_n$ or Offset($P_n$). Now there is sufficient information available to compute $T_n$ as shown 1026. Then, 1028, if EndBit=1, we have reached the end of a block of the PDT, and execution passes to 1006 in FIG. 11A. Otherwise, if EndBit=0, there are more PDT entries in this block, and they must be loaded and processed by jumping back to 1022 and proceeding through the same sequence.

In the case that J=1, the parameter j then varies from 0 to J−1, or from 0 to 0, thus the parameter j is always 0 and not needed in the PDT. This simplified case is shown in FIGS. 10A and 10B, which show the identical process of FIGS. 11A and 11B, but with j=0.

For the purpose of clarity, a short section of example code will be given, to demonstrate a possible implementation of the algorithm.

The process of the invention has actually been implemented in assembly language. However, it is given in C for the purpose of clarity.

```
// assume packed data table uses 32-bit entries
unsigned long *PDT;
// assume only two raw data streams
// assume each raw data stream holds 8-bit values
// assume J=4
// use long* pointers to load J=4 values per load
unsigned long *RawDataStream1, *RawDataStream2;
unsigned char *DisplayBuffer;
int M=200000, J=4;
int EndBit, K;
unsigned char Offset_Pn;
int i, j, PDT_Count=0;
unsigned long RawDataBlock0, RawDataBlock1;
unsigned long LUT[256]; // holds actual 32-bit Pn vectors
// loop for Z iterations, where Z = M/J
for( i = 0; i < (M/J); i++ )
{
    /* note that at any time, m = i*J, even though m is not
    calculated */
    /* Read J=4 values from each of the two raw data streams, which
    brings the following implicit neighborhoods into the cache:
    B[m] , ..., B[m+J-1] */
    RawDataBlock0 = RawDataStream1[i]; // load 4 × 8-bit values
    RawDataBlock1 = RawDataStream2[i]; // load 4 × 8-bit values
    While ( !EndBit ) // loop for one block of the PDT
    {
        // read the next value from the Packed Data Table
        PackedValue = PDT [PDT_Count++];
        // Unpack/Decode 'PackedValue':
        // Extract the parameter vector Pn
        Offset_Pn = (PackedValue | Pn_MASK) >> Pn_SHIFT;
        // Extract the value 'j' (0 <= j < J)
        j = (PackedValue | j_MASK ) >> j_SHIFT;
        // Extract the value 'n' (0 <= n < N)
        n = (PackedValue | n_MASK) >> n_SHIFT;
        // Extract the EndBit (0 or 1)
        EndBit = (Packedvalue | End_MASK) >> End_SHIFT;
        /* Perform the function K = F( B[m+j], LUT[Offset_Pn] ), by
        executing appropriate operations on Bm and Pn */
        K = F(RawDataBlock0, RawDataBlock1, LUT [Offset_Pn]);
        // Write the value Tn = K to the display buffer
        DisplayBuffer[n] = K;
    }
}
/* if we are here, the entire DisplayBuffer[ ] has been written and can be
displayed on the display device */
```

The process of the invention is not limited to the polar to Cartesian mapping. The process can be applied to any spatial transformation, however, the efficiency of the process has a strong dependence on the geometry of the spatial transformation.

When applying the process to other spatial transformations, the geometrical configuration of the implicit neighborhood is the main factor which affects efficiency. In the polar-Cartesian problem, for ANY seed point $S_m$ in the raw data, the geometrical configuration of the corresponding implicit neighborhood $B_m$ is the same. Thus, all seed points $S_m$ have implicit neighborhoods with equal geometry.

In a spatial transformation where each point $S_m$ has an implicit neighborhood $B_m$ with equal geometric configuration, then the algorithm works with efficiency equal to the polar-Cartesian problem.

In a spatial transformation where there are several different geometries of implicit neighborhoods depending on the point $S_m$, then the efficiency of the algorithm is decreased. In such a case, the actual implicit neighborhood $B_m$ used in the algorithm must be the union of all required implicit neighborhood geometries, and the parameter vectors $P_n$ must be adjusted so that the function F( ) only operates on the desired subset of the complete implicit neighborhood.

In a spatial transformation which is completely asymmetrical with random geometry, each point $S_m$ would have an implicit neighborhood with a different geometry. In such a case, the algorithm of the invention can still be applied, but the efficiency would be so poor that there would be no advantage to use the invention.

Thus, the process of the invention can be applied, with advantage, to any spatial transformation where the number of different implicit neighborhood geometries is much less than the total number of points $S_m$ in the raw data.

As will be apparent to those skilled in the art, in the light of the foregoing disclosure, many alterations and modifications are possible in the practice of this invention without departing from the spirit or scope thereof. The invention, in its broader aspects, is therefore not limited to the specific details and example implementations shown and described. For example, the PDT can be implemented in ways other than described, with the same intent, and the process can be applied to a large and general class of spatial transformations as described. Further, the process of the invention is not limited to scan conversion with ultrasound or radar, but can be applied to any application where spatial transformation is required.

We claim:

1. A method for transforming data vectors representing a spatial image into a display image, in an ultrasound/radar system the method comprising:
   a. providing a table containing transformation characteristics and an entry per display image pixel, each table entry including at least one of (i) an address of a display image pixel and (ii) a parameter for computing a display image pixel from a set of data vector points;
   b. loading the data vectors and the table entries into a cache memory;
   c. computing the display image using the data vectors and the table of transformation characteristics while reading the data vectors and the table sequentially; and
   d. outputting the display image to a display, the display displaying at least a portion of the display image.

2. The method of claim 1 wherein the computation of the display image occurs in realtime.

3. The method of claim 1 wherein the display image pixels are written to the cache memory sequentially.

4. The method of claim 1 wherein the display image pixels are written to the cache memory non-sequentially.

5. A method for transforming data vectors representing a spatial image into a display image, in an ultrasound/radar system the method comprising:
   a. providing a table containing transformation characteristics and an entry per display image pixel, the transformation characteristics including a predetermined relationship between the polar coordinate domain and the Cartesian coordinate domain;
b. loading the data vectors and the table entries into a computer-readable cache memory;
c. computing the display image using the data vector and the table of transformation characteristics while reading the data vectors and the table sequentially from the computer-readable cache memory; and
d. non-sequentially writing the display image pixels to the computer-readable cache memory.

* * * * *